United States Patent
Chakraborty

(10) Patent No.: US 7,355,403 B2
(45) Date of Patent: Apr. 8, 2008

(54) NOISE REDUCTION IN DIFFUSION TENSOR IMAGING DATA USING BAYESIAN METHODS

(75) Inventor: Amit Chakraborty, Cranbury, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 367 days.

(21) Appl. No.: 11/268,766

(22) Filed: Nov. 7, 2005

(65) Prior Publication Data

US 2006/0165308 A1    Jul. 27, 2006

Related U.S. Application Data

(60) Provisional application No. 60/647,625, filed on Jan. 27, 2005.

(51) Int. Cl.
*G01V 3/00* (2006.01)

(52) U.S. Cl. ...................... 324/307; 324/309

(58) Field of Classification Search ........ 324/300–322; 600/407–455; 382/254, 131; 128/653.2
See application file for complete search history.

(56) References Cited

U.S. PATENT DOCUMENTS

| | | | |
|---|---|---|---|
| 5,969,524 A * | 10/1999 | Pierpaoli et al. ............ | 324/307 |
| 6,614,226 B2 * | 9/2003 | Wedeen ...................... | 324/309 |
| 6,642,716 B1 * | 11/2003 | Hoogenraad et al. ....... | 324/309 |
| 6,775,401 B2 * | 8/2004 | Hwang et al. .............. | 382/131 |
| 6,782,143 B1 * | 8/2004 | Dube et al. ................. | 382/300 |
| 6,806,705 B2 * | 10/2004 | van Muiswinkel et al. . | 324/307 |
| 6,815,952 B1 * | 11/2004 | Rose et al. ................. | 324/307 |
| 6,853,189 B1 * | 2/2005 | Pipe ........................... | 324/307 |
| 7,078,897 B2 * | 7/2006 | Yablonskiy et al. ........ | 324/307 |
| 7,102,352 B2 * | 9/2006 | Hinks et al. ................ | 324/318 |
| 7,218,110 B2 * | 5/2007 | Zhang et al. ............... | 324/309 |
| 2006/0281987 A1 * | 12/2006 | Bartesaghi et al. ......... | 600/410 |
| 2007/0112585 A1 * | 5/2007 | Breiter et al. .................. | 705/2 |

* cited by examiner

*Primary Examiner*—Brij B. Shrivastav

(57) ABSTRACT

A method and computer program product for reducing noise in diffusion tensor imaging data utilizes an optimization function performed on voxels or pixels of the image. The optimization function includes a neighborhood relevance component that considers diffusion tensor matrices from neighboring pixels or voxels. The neighborhood relevance component is modeled as a Markov Random Field. The method includes an iteration that seeks convergence of an Expectation Maximization algorithm performed on the diffusion tensor matrices.

30 Claims, 2 Drawing Sheets

NOISE REDUCTION IN DIFFUSION TENSOR IMAGING DATA USING BAYESIAN METHODS

CLAIM OF PRIORITY

This application claims priority to, and incorporates by reference herein in its entirety, U.S. Provisional Patent Application Ser. No. 60/647,625, filed Jan. 27, 2005, and entitled "Noise Reduction in Diffusion Tensor Imaging Data Using Bayesian Methods."

FIELD OF THE INVENTION

The present invention relates generally to the field of magnetic resonance imaging. More specifically, the invention relates to improving images of fibrous tissue made using diffusion tensor magnetic resonance imaging, by reducing noise in those images.

BACKGROUND OF THE INVENTION

White matter in the brain is the wiring that enables functional networks and allows their intercommunication. Neural signals are processed in the cortex and transmitted to different regions of the brain through white matter pathways. White matter pathways can be categorized into commissural fibers, which connect regions between hemispheres; association fibers, which connect regions in the same hemisphere; and projection fibers, which establish connections between cortical and subcortical areas. Determination of those axonal pathways provides invaluable means to reveal the human brain's connectivity, which is fundamental to the study of brain function.

While the basic anatomy of white matter tracts in the human brain is known in general from anatomic dissection, much is unknown about the natural variation and association with age, sex, handedness and laterality, as well as abnormalities in many neuropsychiatric, neurologic and developmental disorders. In autism, for example, subtle, yet distinct, abnormalities in white matter have been observed, yet much remains to be characterized. White matter has traditionally been underemphasized relative to the gray matter in the study of many of those disorders. Recent advances in neuroimaging have enabled tremendous growth in the study of the human brain. While fMRI (functional magnetic resonance imaging) essentially enables the study of the gray matter, diffusion weighted magnetic resonance imaging (DW-MR) enables the study of white matter. DW-MR enables the in vivo measurement of the passive diffusion (random displacement) of water molecules. DW-MR is unique in its ability to capture the restricted diffusion of water molecules seen in fibrous tissues. Information derived from diffusion images can be used to infer the structural organization of such tissue components. In one technique of DW-MR, diffusion tensor imaging (DTI), each scan comprises at least six gradient directions, which are used to compute a diffusion tensor.

In human tissue, the mobility of water molecules is isotropic and its motion is limited by the presence of tissue components such as cell membranes and fibers. When those elements are aligned, the diffusion becomes directionally preferential and thus anisotropic. In the white matter, axons are organized in parallel bundles and water diffuses preferentially in the direction of the axonal fibers. The higher diffusion hindrance that is exhibited across the axonal axes is believed to be due to cell membranes and cytoskeletal structures. While the real source of the measured anisotropic diffusion (i.e., how much is due to extracellular spaces or due to intra-axonal microtubules and microfilaments) is not fully understood, it is clear that it directly reflects the underlying oriented axonal structure. Validation has been done, for example, using capillary tube phantoms and with contrast enhanced rat brain images.

The anisotropic diffusion that is observed in the white matter can be captured by diffusion-weighted images, and is represented by a signal decrease due to diffusive motion in the direction of the applied gradient field. The apparent diffusion which is measured by DW-MR does not simply depend on the viscosity but also on the cellular structure of the tissue. That degree of anisotropy reflects some combination of integrity, directional uniformity and density of the underlying fiber structure. The magnitude of the anisotropy and the dominant diffusion direction can be readily measured by DW-MR.

The Stejkal-Tanner equation governing the spin-echo intensity at each location x at angle $(\Theta, \Phi)$ is:

$$s(x, \Theta, \Phi) = s_0 e^{-bd(x,\Theta,\Phi)}$$

where $s_0$ is the non-diffusion weighted signal and d is the apparent diffusion at that angle. b is the diffusion-sensitizing gradient factor and is a function of the gyro magnetic ratio of the proton as well as the gradient strength and timings of the diffusion-sensitizing gradients. In diffusion tensor imaging (DTI), the local diffusion is modeled as an anisotropic Gaussian which can be described by a second order tensor. In that case, the above equation becomes:

$$s(x, \Theta, \Phi) = s_0 e^{-bv^T D v}$$

where D is the apparent diffusion tensor and v is the diffusion direction. By acquiring diffusion-weighted data in at least six non-collinear directions, it is possible to estimate this 3×3 symmetric diffusion tensor. Diagonalization of the tensor matrix yields its eigenvalues and eigenvectors, which represent the main diffusion orientations. The eigenvector corresponding to the largest eigenvalue of the tensor is the main direction of diffusion and is taken as parallel to the local tangent of a fiber bundle.

Advances in DW-MR have now made possible quantitative analysis of white matter in the brain. Progress in understanding the macroscopic neuropathology of white matter disorders will be greatly enhanced by reliable, valid and efficient means of white matter quantification. The present invention includes techniques and an automated computer system for the analysis of brain white matter from DW-MR imaging data. The techniques will be applicable to many white matter disorders, and will provide an accurate and efficient comprehensive framework for the study of white matter structure crucial to the understanding of the brain and patients with disorders of white matter.

More specifically, the inventor proposes a novel method believed to yield better results especially when the measured data has a low signal-to-noise ratio (SNR). One of the problems faced by researchers in fiber tractography is that the diffusion-weighted images from which the DTI is inferred are particularly noise sensitive in view of the high degree of signal attenuation needed for suitable diffusion weighting. The widely used method to compute the tensor data from the raw diffusion-weighted images is particularly error-prone simply because it doesn't take into consideration any noise removal strategies. That can lead to errors in the major eigenvector direction and artificially increase the anisotropy. Those factors can lead to spurious connection when none exists originally, due to track drifting.

Often the deviation from a high SNR happens in practice because the image quality is compromised for feasible imaging times. A larger voxel size improves the SNR but leads to partial volume effects. If multiple fibers pass through a single voxel, that could result in an isotropic reading that completely belies the underlying realty.

There has been some effort to resolve those problems by doing diffusion spectrum imaging. For example, in J. D. Tournier et al., *Diffusion weighted magnetic resonance fiber tracking using a front evolution algorithm*, 20 NeuroImage 276-288 (2003), the authors take a representative sample of the most likely directions at each point, and each sample is allocated its index of connectivity. In other words, several paths are evaluated at every point before settling on the dominant one. That solution takes into account some measure of neighborhood inference. In C. Chefd'hotel, D. Tschumperl, R. Deriche, and O. Faugeras, *Constrained flow of matrix valued functions: Application to diffusion tensor regularization*, Proceedings of the ECCV 251-265 (2000), the tensor field is regularized and is constrained to be positive definite.

Advances in diffusion weighted magnetic resonance (DW-MR) imaging have made possible the detailed quantitative analysis of white matter in the brain. Diffusion imaging has been most successful in the study of large white matter tracts, such as the corpus callosum and corticospinal tracts, which consist of tightly packed fiber bundles coursing in the same direction. Other tracts, however, are intermingled with fibers that course in various directions. As a result, their depiction has often been imprecise, as it is based on sketches of the tracts, not on precise data provided by dissected material. Progress in understanding the macroscopic neuropathology of white matter disorders would be greatly enhanced by reliable, valid and efficient means of white matter quantification.

However, reliable tracking and quantification is impossible unless the acquired image quality can be improved. There is therefore presently a need for a method and system for reducing noise in a diffusion tensor image, thereby improving the image quality without losing important information regarding fiber crossings. To the inventor's knowledge, no such techniques are currently available.

SUMMARY OF THE INVENTION

The present invention addresses the needs described above by providing a method for reducing noise in diffusion tensor imaging data, the data comprising a matrix of elements, and each element being represented by a diffusion tensor matrix a In the method, for each element of the imaging data, the following steps are performed: a version of an optimization function for the matrix $\alpha$ is computed, the optimization function including a neighborhood relevance component for the selected element; and a new matrix $\alpha$ is computed using the optimization function. The steps are repeated until convergence of the imaging data.

The step of computing a version of an optimization function for the matrix $\alpha$ may further comprise diagonalizing the matrix $\alpha$; and may comprise computing eigenvalues and eigenvectors of the matrix $\alpha$.

The method may further include the step of repeating the steps of computing a version of the optimization function and computing a new matrix $\alpha$ until convergence for the element The step of repeating the steps until convergence of the imaging data may comprise repeating the steps until a sum of differences between the new matrix $\alpha$ and a previous value of the matrix $\alpha$ is greater than a threshold value.

The neighborhood relevance component of the optimization function may be modeled as a Markov Random Field.

The neighborhood relevance component of the optimization function may be computed by placing a maximum a posteriori constraint on the matrix $\alpha$. In that case, a prior probability defining the a posteriori constraint may have the distribution:

$$\frac{1}{Z} e^{-U_{MRF}(\hat{\alpha}_s | \hat{\alpha}_{s_N})}$$

wherein Z is a normalization constant, and:

$$U_{MRF}(\hat{\alpha}_s | \hat{\alpha}_{s_N}) = \int_v m(\alpha_s, \alpha_v) dv$$

wherein $m(\alpha_s, \alpha_v)$ is a distance metric between estimated tensor parameters at volume locations s and v. m may emphasize similarity of direction, considering all directions.

The optimization function may further comprise a maximum likelihood estimate (MLE) based on measurements of the subject element In that case, the MLE may be given by:

$$\alpha_{MLE} = (B^T \Sigma^{-1} B)^{-1} (B^T \Sigma^{-1}) x$$

wherein B is a combined matrix summarizing a measured attenuating effect of magnetic gradients in a plurality of directions, $\Sigma$ is a covariant matrix of a multivariate Gaussian noise, and x is a matrix of the form:

$$x = B\alpha + \pi$$

wherein $\pi$ is noise having a distribution $N(0, \Sigma)$. The noise $\eta$ may be modeled as white Gaussian noise.

The diffusion tensor imaging data may be collected during measurement of brain white matter. The image elements may be pixels, or may be voxels.

In another embodiment of the invention, a computer program product is provided, including a computer readable recording medium having recorded thereon a computer program comprising code means for, when executed on a computer, instructing said computer to control steps in the method described above.

DESCRIPTION OF THE INVENTION

White matter image analysis is of fundamental importance in understanding brain function because of the anatomical network of connections that it establishes. There are many disorders of the white matter of the brain, and disorders where white matter plays a crucial role, including de-myelinative disorders (e.g. multiple sclerosis), infectious diseases (e.g. AIDS dementia, encephalitis), inflammatory diseases (e.g. lupus), traumatic brain injury, cancer, epilepsy, Alzheimer disease and post-surgical disorders. There are also many conditions where white matter is now being understood to play an important role, including drug abuse, mood disorders, schizophrenia and autism. In the evaluation of the methods developed here, the inventor has focused on autism because of the significant role of white matter in that debilitating disorder.

The invention is a modular framework and method and is deployed as software as an application program tangibly embodied on a program storage device. The application is accessed through a graphical user interface (GUI). The application code for execution can reside on a plurality of different types of computer readable media known to those skilled in the art. Users access the framework by accessing the GUI via a computer.

Figure 1:
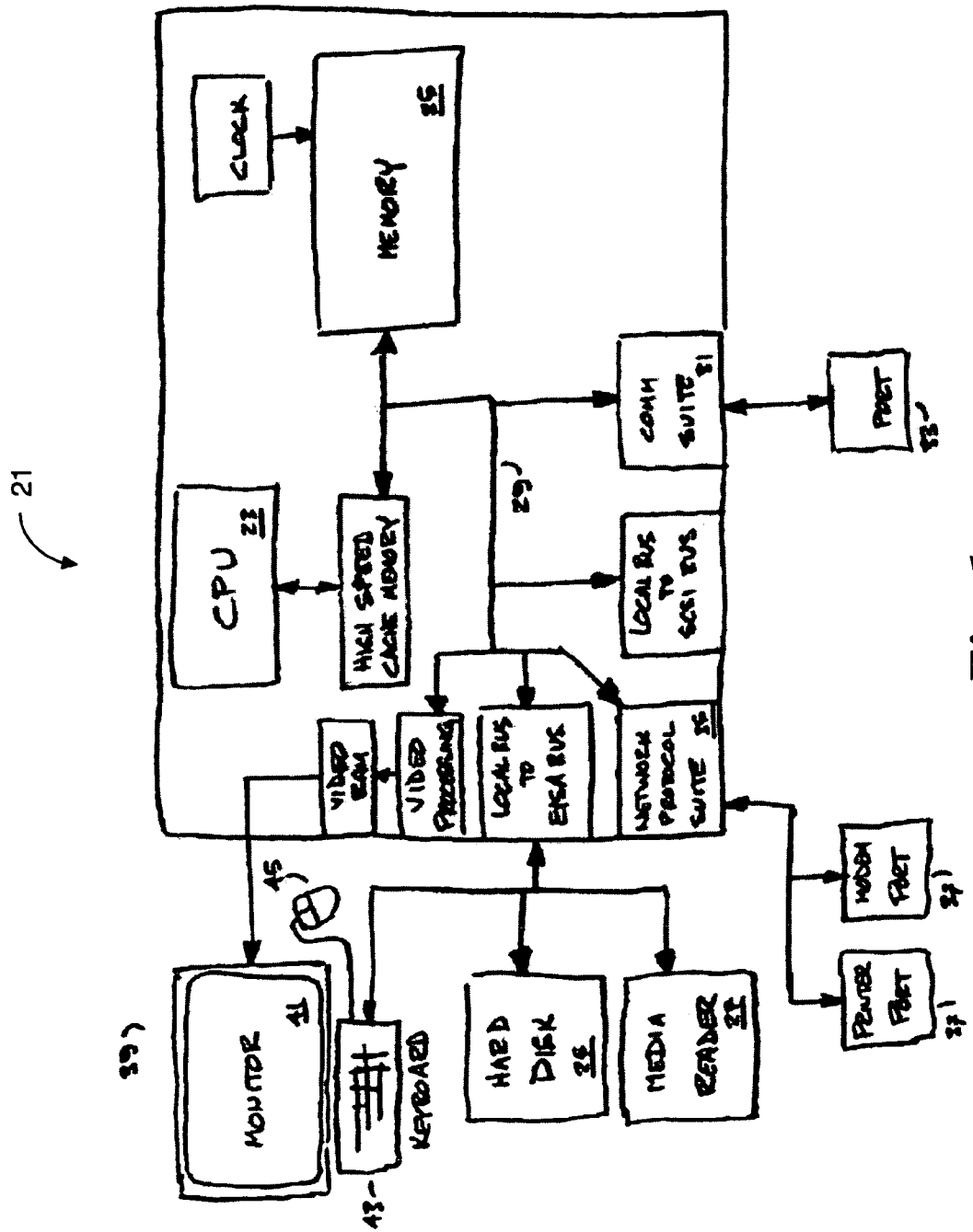
FIG. 1 is a schematic diagram showing a computer for executing instructions of an embodiment of the invention.

An embodiment of a computer 21 executing the instructions of an embodiment of the invention is shown in FIG. 1. A representative hardware environment is depicted which illustrates a typical hardware configuration of a computer. The computer 21 includes a CPU 23, memory 25, a reader 27 for reading computer executable instructions on computer readable media, a common communication bus 29, a communication suite 31 with external ports 33, a network protocol suite 35 with external ports 37 and a GUI 39.

The communication bus 29 allows bi-directional communication between the components of the computer 21. The communication suite 31 and external ports 33 allow bi-directional communication between the computer 21, other computers 21, and external compatible devices such as laptop computers and the like using communication protocols such as IEEE 1394 (FireWire or i.LINK), IEEE 802.3 (Ethernet), RS (Recommended Standard) 232, 422, 423, USB (Universal Serial Bus) and others.

The network protocol suite 35 and external ports 37 allow for the physical network connection and collection of protocols when communicating over a network. Protocols may include TCP/IP (Transmission Control Protocol/Internet Protocol) suite, IPX/SPX (Internetwork Packet eXchange/ Sequential Packet eXchange), SNA (Systems Network Architecture), and others. The TCP/IP suite includes IP (Internet Protocol), TCP (Transmission Control Protocol), ARP (Address Resolution Protocol), and HTTP (Hypertext Transfer Protocol). Each protocol within a network protocol suite has a specific function to support communication between computers coupled to a network. The GUI 39 includes a graphics display such as a CRT, fixed-pixel display or others 41, a key pad, keyboard or touchscreen 43 and pointing device 45 such as a mouse, trackball, optical pen or others to provide an easy-to-use, user interface for the invention.

The computer 21 can be a handheld device such as an Internet appliance, PDA (Personal Digital Assistant), Blackberry device or conventional personal computer such as a PC, Macintosh, or UNIX based workstation running their appropriate OS (Operating System) capable of communicating with a computer over wireline (guided) or wireless (unguided) communications media. The CPU 23 executes compatible instructions or software stored in the memory 25. Those skilled in the art will appreciate that the invention may also be practiced on platforms and operating systems other than those mentioned.

The computer 21 may include a suitable image rendering application that can process digital image data of an acquired image dataset to generate and display 2-D and/or 3-D images on the display 41. The image rendering system may be an application that provides 2D/3D rendering and visualization of medical image data and which executes on the computer. The image rendering system enables a user to navigate through a plurality of 2-D image slices or a 3-D image.

The technique discovered by the inventors for reducing noise in a diffusion tensor image will now be described. In an anisotropic medium in tensor imaging, it has been shown that one can write the echo intensities in a spin-echo image acquired using a pulsed gradient excitation in terms of the effective second-order self-diffusion tensor D:

$$\ln\left[\frac{S_b}{s_0}\right] = -bD\ln\left[\frac{s(b)}{s_0}\right] = -b.D^{eff}\ln\left[\frac{A(b)}{s_0}\right] = -b.D^{eff}$$

where $S_b$ is the echo intensity with gradients corresponding to b, and $s_0$ is the value when no gradient is applied. D can be defined by the magnetic properties of the equipment and the echo time. From the experiment protocol, one can compute the b values and observe the echo intensity image from which the elements in D can be estimated. It will be assumed that the measurements are corrupted by white Gaussian noise. That expression may be written in matrix form:

$$x = B\alpha + \eta$$

where $\alpha = (D_{xx}, D_{yy}, D_{zz}, D_{xy}, D_{yz}, D_{zx})$ is the vector comprised of the elements of the diffusion tensor, and $\eta$ is the noise distributed as:

$$\eta \sim N(0, \Sigma)$$

and $\Sigma$ is the covariance matrix of the multivariate Gaussian noise. The elements of the combined B-matrix summarize the attenuating effect of all gradients applied for each direction.

Under the above assumptions, it can easily be proved that the maximum likelihood estimate (MLE) for $\alpha$ is given by:

$$\alpha_{opt} = \alpha_{MLE} = (B^T\Sigma^{-1}B)^{-1}(B^T\Sigma^{-1})x$$

The formulation above and the maximum likelihood estimate assumes independence between the neighboring pixels, and thus is in many ways simplistic and fails to take into consideration the issues described above.

Neighborhood relevance is introduced by re-formulating the above problem as a maximum a posteriori estimation problem. Whereas in the MLE formulation, no a priori constraint on α was assumed, in this case, it is assumed that knowledge exists regarding the prior. Hence, the optimization problem becomes $$\alpha_{opt} = \alpha_{MAP} = \underset{\alpha}{\operatorname{argmax}}\, p_{\alpha|x}(\alpha \mid x)$$

$$\propto \underset{\alpha}{\operatorname{argmax}}\, p_{x|\alpha}(x \mid \alpha) p_\alpha(\alpha)$$

In the case of MLE, the prior term, $p_\alpha(\alpha)$, is the identity, that is, no information about it exists.

Several prior models may be investigated to determine which suits the requirements best and provides the most optimal estimates for the parameters under question. All such models, however, are considered to belong to a general class of Markov Random Fields and thus the prior probabilities can be modeled using a Gibbs distribution:

$$p(\alpha_s = \hat{\alpha}_s) \propto \frac{1}{Z} e^{-U_{MRF}(\hat{\alpha}_s | \hat{\alpha}_{s_N})}$$

where s is the location of the material in the volume and Z is a normalization constant. The neighborhood energy function is given by:

$$U_{MRF}(\hat{\alpha}_s \mid \hat{\alpha}_{s_N}) = \int_v m(\alpha_s, \alpha_v) dv$$

wherein $m(\alpha_s, \alpha_v)$ is a distance metric between the estimated tensor parameters at the two volume locations s and v. m is designed in such a way as to emphasize similarity of direction using the full diffusion ellipsoid (rather than reducing to a single principal direction). In that way, smoothing is allowed along directions of diffusion.

Estimating $\alpha_{MAP}$ at each location given by the above-described optimization problem is highly non-trivial. To obviate that, the inventors use the Expectation Maximization (EM) method. During the E-step, the posterior probability is estimated, which actually yields the objective function estimate given a certain value of α obtained from the previous iteration. Next, during the M-step, the parameter vector α is calculated. That sequence of steps is repeated until convergence. It can be shown that the EM algorithm is guaranteed to converge to a local minimum.

Figure 2:
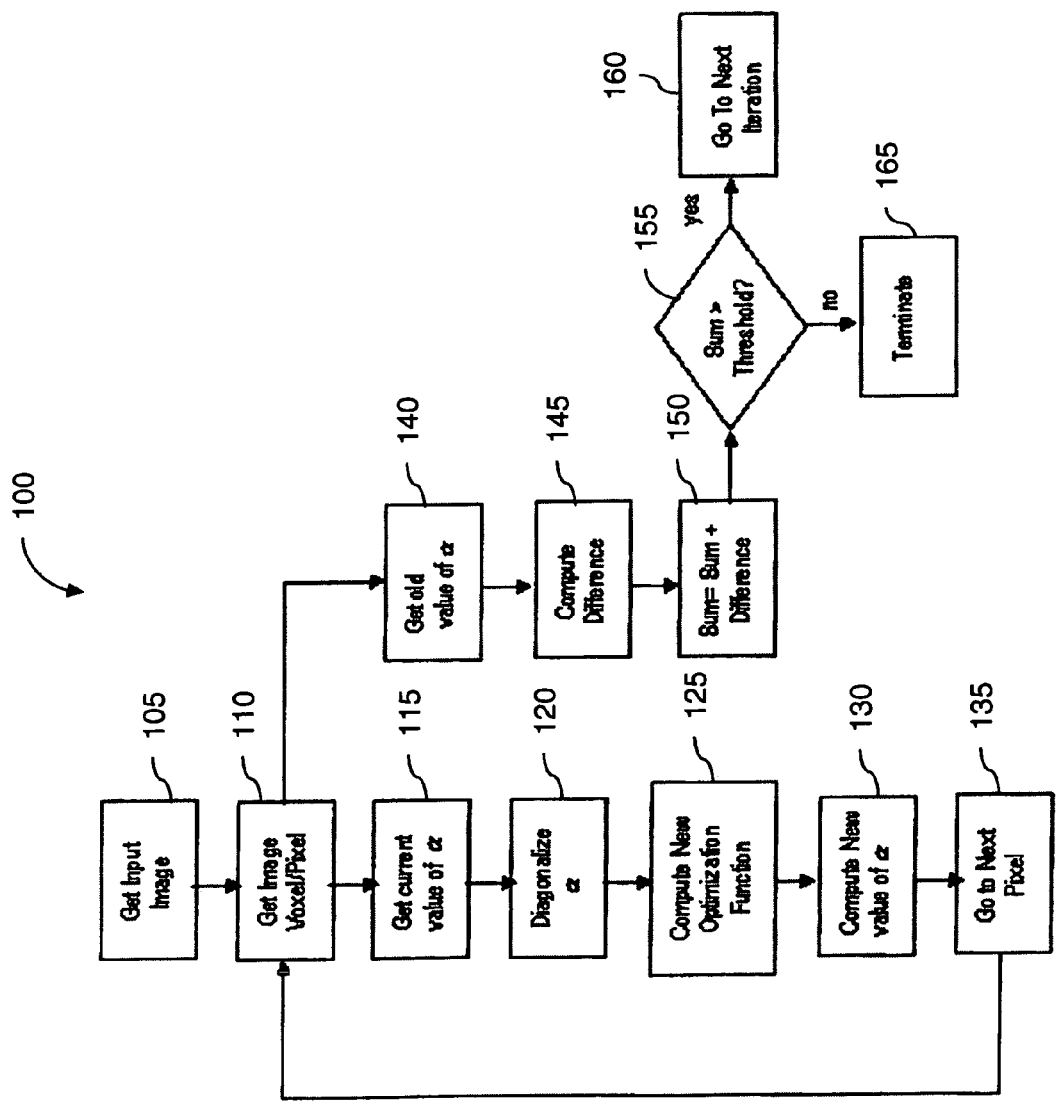
FIG. 2 is a flow chart showing a method according to one embodiment the invention.

A method 100 according to one embodiment of the invention is represented by the flow chart of FIG. 2. As a first step, a diffusion tensor (DT) input image is acquired (step 105). Steps 115 through 135 are performed on each pixel or voxel element of the image as the method indexes through each element (step 10). At each voxel or pixel element, there is a 3×3 matrix that defines the DT matrix. A value for α, which is simply the 9 elements of that matrix stacked one after the other, is determined for the current voxel or pixel element (step 115).

The DT matrix α is then diagonalized (step 120) to get the eigenvalues which are the principle components that indicate the three flow directions.

A new version of the optimization function is then computed (step 125) for the current element. As discussed above, there are two parts to the optimization function. One part is a straight-forward data-driven term. That term may comprise a maximum likelihood estimate (MLE) based on measurements of the subject element. Another part of the optimization function is a changing part that depends on the current value of the principle components of the pixel or voxel element under observation, and how well it fits within the neighborhood. That neighborhood relevance component of the optimization function is computed by placing a maximum a posteriori constraint on the matrix α.

Using the new optimization function, a new value of α is calculated (step 130). That calculation is the M-step in the proposed EM algorithm.

The optimization function computation step 125 and the α computation step 130 are then repeated until convergence for that pixel or voxel element. Convergence of that value produces a new value of the diffusion tensor.

The steps 110-130 are then repeated (step 135) for all the voxels or pixels in the image, until convergence. Convergence for the image is determined in the branch of the method 100 including steps 140-165. For each element in the image, a previous value for α is retrieved (step 140), compared to the most recently calculated value (step 145). The difference is accumulated (step 150) over the whole image. If the sum of the differences is larger than a predetermined amount (decision 155), the system goes to the next iteration (step 160). If the difference is negligible, the program is terminated (step 165).

In sum, the above-described technique is proposed to improve SNR for diffusion tensor data. The inventive method is unlike known image smoothing techniques because the underlying voxel values are tensors, i.e. a 3×3 matrix, as opposed to a scalar or even a one dimensional vector. The technique considers neighborhood influence on the individual image elements in a very unique way. It looks at the principle components and attempts to align all of them as opposed to only the dominant one.

Optimization is achieved via the use of an EM algorithm, a unique approach within such a problem. The use of that algorithm permits smoothing without smoothing across fiber directions.

The foregoing Detailed Description is to be understood as being in every respect illustrative and exemplary, but not restrictive, and the scope of the invention disclosed herein is not to be determined from the Description of the Invention, but rather from the Claims as interpreted according to the full breadth permitted by the patent laws. For example, while the technique is described primarily for use in connection with diffusion tensor MRI data, those skilled in the art will understand that the technique may be used as well in connection with other, similar imaging technologies where non-isotropic characteristics are to be detected. It is to be understood that the embodiments shown and described herein are only illustrative of the principles of the present invention and that various modifications may be implemented by those skilled in the art without departing from the scope and spirit of the invention.

What is claimed is:

1. A method for reducing noise in diffusion tensor imaging data, the data comprising a matrix of elements, each element represented by a diffusion tensor matrix α, the method comprising the steps of:
   for each element of the imaging data:
      computing a version of an optimization function for the matrix α, the optimization function including a neighborhood relevance component for the selected element; and
      computing a new matrix α using the optimization function;
   repeating the steps until convergence of the imaging data.

2. The method of claim 1, wherein the step of computing a version of an optimization function for the matrix α further comprises diagonalizing the matrix α.

3. The method of claim 1, wherein the step of computing a version of an optimization function for the matrix α further comprises computing eigenvalues and eigenvectors of the matrix α.

4. The method of claim 1, further comprising the step of:
   repeating the steps of computing a version of the optimization function and computing a new matrix α until convergence for the element.

5. The method of claim 1, wherein the step of repeating the steps until convergence of the imaging data comprises repeating the steps until a sum of differences between the new matrix α and a previous value of the matrix α is greater than a threshold value.

6. The method of claim 1, wherein the neighborhood relevance component of the optimization function is modeled as a Markov Random Field.

7. The method of claim 1, wherein the neighborhood relevance component of the optimization function is computed by placing a maximum a posteriori constraint on the matrix α.

8. The method of claim 7, wherein a prior probability defining the α constraint has the distribution:

$$\frac{1}{Z}e^{-U_{MRF}(\hat{\alpha}_s|\hat{\alpha}_{s_N})}$$

wherein Z is a normalization constant, and:

$$U_{MRF}(\hat{\alpha}_s|\hat{\alpha}_{s_N}) = \int_v m(\alpha_s, \alpha_v)dv$$

wherein $m(\alpha_s, \alpha_v)$ is a distance metric between estimated tensor parameters at volume locations s and v.

9. The method of claim 8, wherein m emphasizes similarity of direction, considering all directions.

10. The method of claim 1, wherein the optimization function further comprises a maximum likelihood estimate (MLE) based on measurements of the subject element.

11. The method of claim 10, wherein the MLE is given by:

$$\alpha_{MLE} = (B'\Sigma^{-1}B)^{-1}(B'\Sigma^{-1})x$$

wherein B is a combined matrix summarizing a measured attenuating effect of magnetic gradients in a plurality of directions, $\Sigma$ is a covariant matrix of a multivariate Gaussian noise, and x is a matrix of the form:

$$x = B\alpha + \eta$$

wherein $\eta$ is noise having a distribution $N(0, \Sigma)$.

12. The method of claim 11, wherein the noise $\eta$ is modeled as white Gaussian noise.

13. The method of claim 1, wherein the diffusion tensor imaging data is collected during measurement of brain white matter.

14. The method of claim 1, wherein the elements are pixels.

15. The method of claim 1, wherein the elements are voxels.

16. A computer program product comprising a computer readable recording medium having recorded thereon a computer program comprising code means for, when executed on a computer, instructing said computer to control steps in a method for reducing noise in diffusion tensor imaging data, the data comprising a matrix of elements, each element represented by a diffusion tensor matrix α, the method comprising the steps of:
for each element of the imaging data:
computing a version of an optimization function for the matrix α, the optimization function including a neighborhood relevance component for the selected element; and
computing a new matrix α using the optimization function;
repeating the steps until convergence of the imaging data.

17. The computer program product of claim 16, wherein the step of computing a version of an optimization function for the matrix α further comprises diagonalizing the matrix α.

18. The computer program product of claim 16, wherein the step of computing a version of an optimization function for the matrix α further comprises computing eigenvalues and eigenvectors of the matrix α.

19. The computer program product of claim 16, wherein the method further comprises the step of:
repeating the steps of computing a version of the optimization function and computing a new matrix α until convergence for the element.

20. The computer program product of claim 16, wherein the step of repeating the steps until convergence of the imaging data comprises repeating the steps until a sum of differences between the new matrix α and a previous value of the matrix α is greater than a threshold value.

21. The computer program product of claim 16, wherein the neighborhood relevance component of the optimization function is modeled as a Markov Random Field.

22. The computer program product of claim 16, wherein the neighborhood relevance component of the optimization function is computed by placing a maximum a posteriori constraint on the matrix α.

23. The computer program product of claim 22, wherein a prior probability defining the a posteriori constraint has the distribution:

$$\frac{1}{Z}e^{-U_{MRF}(\hat{\alpha}_s|\hat{\alpha}_{s_N})}$$

wherein Z is a normalization constant, and:

$$U_{MRF}(\hat{\alpha}_s|\hat{\alpha}_{s_N}) = \int_v m(\alpha_s, \alpha_v)dv$$

wherein $m(\alpha_s, \alpha_v)$ is a distance metric between estimated tensor parameters at volume locations s and v.

24. The computer program product of claim 23, wherein m emphasizes similarity of direction, considering all directions.

25. The computer program product of claim 16, wherein the optimization function further comprises a maximum likelihood estimate (MLE) based on measurements of the subject element.

26. The computer program product of claim 25, wherein the MLE is given by:

$$\alpha_{MLE} = (B'\Sigma^{-1}B)^{-1}(B'\Sigma^{-1})x$$

wherein B is a combined matrix summarizing a measured attenuating effect of magnetic gradients in a plurality of directions, $\Sigma$ is a covariant matrix of a multivariate Gaussian noise, and x is a matrix of the form:

$$x = B\alpha + \eta$$

wherein $\eta$ is noise having a distribution $N(0, \Sigma)$.

27. The computer program product of claim 26, wherein the noise $\eta$ is modeled as white Gaussian noise.

28. The computer program product of claim 16, wherein the diffusion tensor imaging data is collected during measurement of brain white matter.

29. The computer program product of claim 16, wherein the elements are pixels.

30. The computer program product of claim 16, wherein the elements are voxels.

* * * * *